INVENTORS
HERBERT DYM
ROBERT J. LYNCH
BY Edward G. Fiorito
ATTORNEY

United States Patent Office 3,400,272
Patented Sept. 3, 1968

3,400,272

TWO DIMENSIONAL SCANNER HAVING BACK-TO-BACK PHOTODIODES

Herbert Dym, Mahopac, and Robert J. Lynch, Lake Peekskill, N.Y., assignors to International Business Machines Corporation, Armonk, N.Y., a corporation of New York Filed June 1, 1965, Ser. No. 460,081
7 Claims. (Cl. 250—211)

ABSTRACT OF THE DISCLOSURE

A two dimensional scanner responsive to radiant energy is disclosed having a matrix array of elements arranged in row and column configurations. The matrix elements consist of series connected back-to-back diodes, one diode of each pair being photosensitive. The pairs of diodes are connected on one side to conductors arranged in rows and on the other side to conductors arranged in columns. The row conductors are terminated at one end in a circuit referred to as a row driver which applies a peak voltage gradient to the row conductors. A column driver applies a voltage grating having a dip therein to the column conductors. The row to which the peak voltage gradient of the matrix array is applied is controlled by a signal source associated with the row driver. The column conductor to which the dip in the voltage gradient is applied is controlled by a signal source connected to the column driver. The column driver and the row driver bias the diode pairs in the non-conducting state with the exception of the diode pair connected between the row conductor having the peak voltage gradient applied thereto and the column conductor having the dip voltage gradient applied thereto. If radiant energy is impinging on the photodiode of the non-biased pair, photocurrent will flow and be detected by an output circuit. By proper adjustment of the signal sources applied to the row and column drivers, different ones of the diode pairs can be placed in the conducting state.

There are several problems associated with scanners such as cathode ray flying spot scanners, orthicon and vidicon tubes. Ordinarily they are large in size, employ high voltages, and are fragile. These problems have been reduced by a device disclosed and claimed in commonly assigned co-pending application Ser. No. 279,531, now Patent No. 3,317,733 entitled, "Radiation Scanner Employing Rectifying Devices and Photoconductors," by J. W. Horton and R. J. Lynch, and in commonly assigned, concurrently filed application Ser. No. 460,233, entitled, "Scanner Employing Unilaterally Conducting Elements," by H. Dym, J. W. Horton and R. J. Lynch. The present invention is directed to an improvement to the above devices permitting two dimensional control of the scanner.

It is an object of the present invention to provide an improved two dimensional scanner employing small, sturdy components.

Another object of the present invention is to provide a two dimensional scanner having improved directional control.

A further object of the present invention is to provide an improved two dimensional scanner capable of holding the area of observation on a stationary point.

Still another object of the present invention is to provide an improved two dimensional scanner capable of changing the size of the area of observation.

These and other objects of the present invention are accomplished by providing a co-ordinate array of series-connected diode pairs arranged in matrix fashion. A series of row conductors join together one end of all pairs located in the same row, while a series of column conductors join together the other end of all pairs located in the same column.

A column driver applies a voltage gradient having a dip therein to the column conductors. A row driver applies a peaked voltage gradient to the row conductor drivers. One of the diodes in each pair is made either responsive to or capable of emitting radiation. The particular diode pair located at the co-ordinate where the dip and peak voltages coincide is rendered operative responding to or emitting radiation, while the remaining diode pairs are back-biased and rendered inoperative.

In accordance with another aspect of the present invention, the drivers are formed with another assembly of diode pairs series connected between two attenuators. The attenuators are supplied with oppositely directed currents producing an increasing voltage gradient on one side of the driver diodes and a decreasing voltage gradient on the other side of the driver diodes. Location of the peak and dip on the row and column conductors is varied by altering the absolute potential of the attenuators.

Present day semiconductor techniques permit the fabrication of this invention using layers of semiconductor materials. Diodes are formed at the junctions between layers providing a small, sturdy device.

Another advantage of the present invention is that the area of response of the scanner can be varied in two dimensions, or held stationary for continuous monitoring of a single localized area. A further advantage of the present invention is the ability to change the size of the area observed by changing the absolute potentials of the attenuators which are of a relatively low value compared to the voltages employed in cathode ray scanners.

The foregoing and other objects, features and advantages of the invention will be apparent from the following more particular description of preferred embodiments of the invention, as illustrated in the accompanying drawings.

Figures 1, 2:
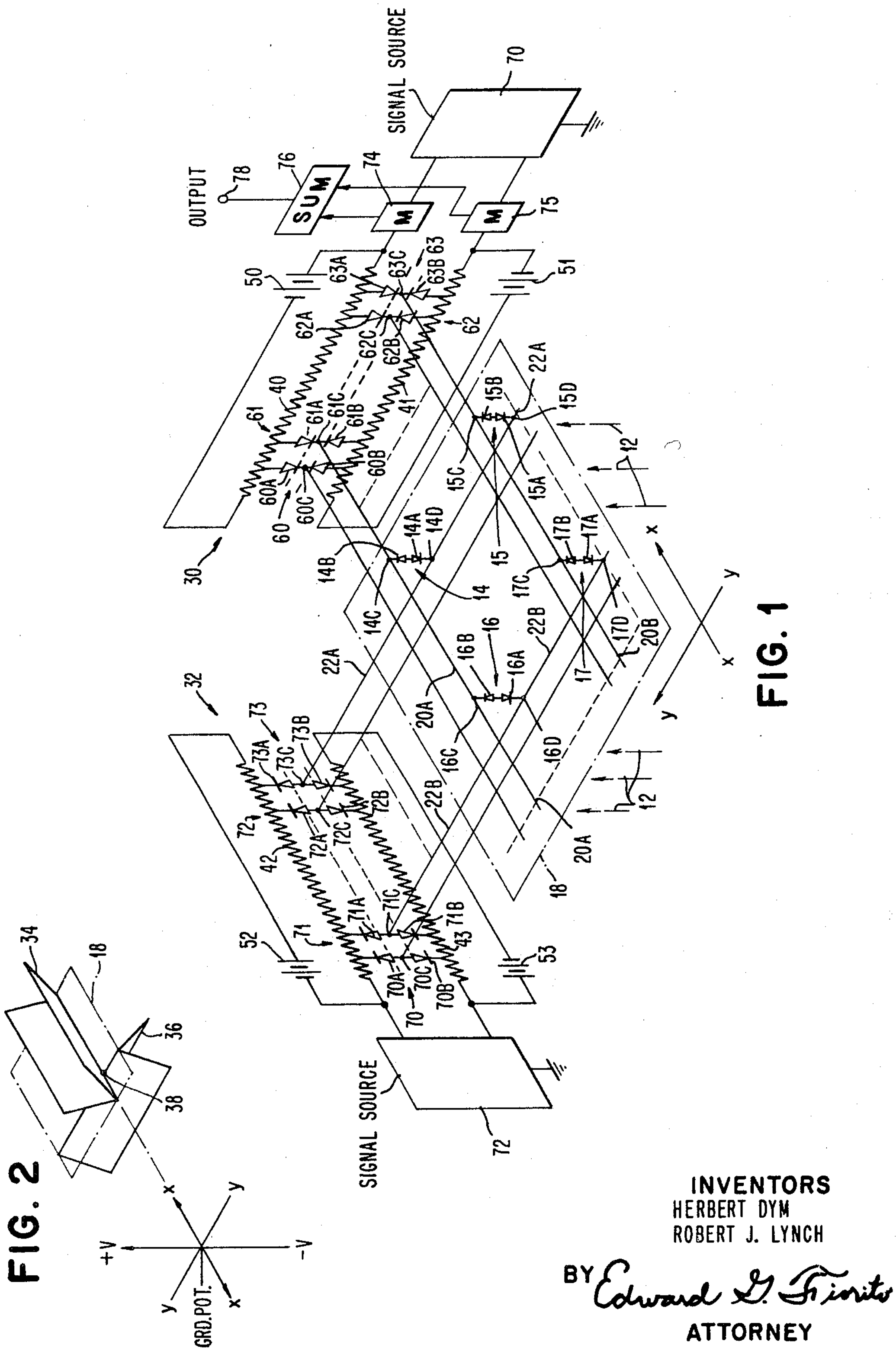
FIG. 1 is an electrical schematic diagram of a circuit embodying the present invention.
FIG. 2 is a graph illustrating the voltage gradients set up in the circuit of FIG. 1.

A circuit 10 is shown in FIG. 1 which embodies the present invention. An image in the form of a group of two dimensionally spaced light rays 12, or other radiation, approaches from below the circuit 10. A group of diode pairs 14–17 are representative of a matrix 18 of diode pairs arranged in a co-ordinate array of rows and columns. Each one of the diode pairs 14–17 is identical and includes a photodiode 14A–17A having conductive properties responsive to light, a blocking diode 14B–17B, and two end terminals 14C–17C and 14D–17D.

A pair of column conductors 20A and 20B are representative of a series of column conductors, each conductor 20 corresponding to one of the columns of diode pairs in the matrix 18. Column conductor 20A is connected to the end terminals of the column of diode pairs represented by terminals 14C and 16C. Conductor 20B is connected to end terminals 15C and 17C and all of the remaining end terminals (not shown in FIG. 1) in the same column.

A pair of row conductors 22A and 22B represents a series of row conductors, each one corresponding to one of the rows in the matrix 18. Row conductor 22A is connected to the end terminals of the row of diode pairs represented by end terminals 14D and 15D. Row conductor 22B is connected to end terminals 16D and 17D and all other end terminals (not shown in FIG. 1) in the same row.

The operation of each diode pair 14–17 is the same and may be described with reference to diode pair 14. When the voltage on column conductor 20A is higher than the voltage on row conductor 22A, blocking diode 14B is back-biased preventing current flow through the diode pair 14.

When the column conductor 20A is at the same potential as the row conductor 22A, blocking diode 14B permits the flow of current through diode pair 14. This flow of current is regulated by the photodiode 14A which responds to the amount of light falling thereon. When the light is of a high intensity a large current flows through the diode pair 14 in a direction from row conductor 22*a* toward column conductor 20*a*. When the photodiode 14A is not illuminated, substantially no current flow occurs through diode pair 14.

A pair of signal generators 30 and 32 drive the column conductors 20 and row conductors 22, respectively. The function of the generators 30 and 32 is to drive the conductors 20 and 22 so that a voltage gradient having the shape shown in FIG. 2 is set up. The location of the matrix 18 is shown in FIG. 2. An upper voltage gradient 34 has a dip in the distribution forming a trough shaped voltage gradient in two dimensions. A lower voltage gradient 36 has a peaked distribution forming a rooftop shape in two dimensions.

Voltage is plotted along the vertical axis in the graph of FIG. 2 with a positive potential (+V), a negative potential (−V) and a ground potential, in between. Horizontal $x$ and $y$ axes locate the position of the matrix 18. The voltage gradients 34 and 36 meet at a point 38 included in the matrix 18 at co-ordinates corresponding, for example, to the location of diode pair 17. The potential at point 38 is at ground level. This condition occurs when column conductor 20B and row conductor 22B are at ground potential. As illustrated in the graph of FIG. 2 all column conductors except 20B are above the ground potential, while all row conductors except 22B are below the ground potential. Therefore all the diode pairs in matrix 18 except diode pair 17 have their respective blocking diodes back-biased. In this manner only diode pair 17 is rendered responsive to the light rays 12 falling thereon.

One circuit for generating the voltage gradients 34 and 36 shown in FIG. 2 is illustrated in FIG. 1. The drivers 30 and 32 include resistor pairs 40–43. Resistors 41–43 are supplied with a constant amount of current by a group of batteries 50–53 respectively so that a linear voltage gradient appears across each resistor. Batteries 50 and 51 are oriented so that the currents flowing through resistors 40 and 41 are in opposite relative directions. In this manner a linearly increasing voltage gradient from left to right is set up in resistor 40, while a linearly decreasing voltage gradient from left to right is set up in resistor 41. Batteries 52 and 53 produce the same effect in resistors 42 and 53.

A group of diode pairs 60–63 represents a series of diode pairs, each one corresponding to one of the column conductors 20. Diode pair 61 includes an upper diode 61A connected to resistor 40 and a lower diode 61*b* connected to resistor 41. The two diodes 61A and 61B are joined together at a point 61C to which row conductor 20A is also connected. The diodes 61A and 61B are oriented so that their forward direction of current flow is toward one another and toward point 61C. Each of the remaining diode pairs represented by group 60–63 are similarly connected.

The voltage on each connection point 60C–63C assumes the higher potential of the resistors 40 or 41 at the location where the associated diode is connected. For example, if the potential on resistor 40 at the connection of diode 61A is higher than the potential on resistor 41 at the connection of diode 61B, then point 61C assumes the potential of resistor 40 at the connection of diode 61A since diode 61A is forward biased and diode 61B is reverse biased. It is possible for both diodes, for example 63A and 63B to be forward biased. This condition occurs when the voltage on resistor 40 at the connection of diode 63A is the same as the voltage on resistor 41 at the connection of diode 63B. For this condition the point 63C assumes the equipotential of both resistors 40 and 41 and diodes 63A and 63B are both forward biased. Column conductor 20B is at the lowest possible potential capable of being assumed by any of the column conductors 20. Referring to FIG. 2 this condition corresponds to the minimum of the voltage gradient 34.

Driver 32 includes a group of diode pairs 70–73 representing a series of diode pairs one for each of the row conductors 32. Diode pair 71 includes an upper diode 71A connected to resistor 42 and a lower diode 71B connected to resistor 43. The diodes 71A and 71B are joined together at a point 71C to which row conductor 22B is also connected. Diodes 71A and 71B are oriented so that their forward direction of current flow is away from one another and away from point 71C. Each of the diodes represented by group 70–73 are connected in a similar manner.

The points 70C–73C assume the lower potential of the resistors 42 or 43 to which the associated diodes are connected. For example if resistor 42 is at a lower potential at the connection of diode 73A than the potential of resistor 43 at the connection of diode 73B, then the point 73C assumes the lower potential of resistor 42 since diode 73A is forward biased and diode 73B is back biased.

Both diodes in pairs 70–73 may be forward biased where, for example, the potential on resistors 42 and 43 at the connection of diodes 71A and 71B are the same. For this condition both diodes 71A and 71B are forward biased and point 71C assumes the equipotential of resistors 42 and 43 at the connection of diode pair 71. Row conductor 22B is at the highest possible potential capable of being assumed by row conductors 22. Referring to FIG. 2 this condition corresponds to the peak of the voltage gradient 36.

In accordance with the preferred method of operation the minimum voltage supplied by driver 30 is ground potential, and the maximum potential supplied by driver 32 is also ground potential. This is accomplished by adjusting the absolute potential of resistors 40–43 using a pair of signal sources 70 and 72 coupled to drivers 30 and 32, respectively. Signal source 70 is coupled to resistors 40 and 41 through a pair of current meters M 74 and 75, the purpose of which is to be described later in the specification.

By raising or lowering the absolute potential of resistors 40 and 41, the voltage gradient 34 can be raised or lowered accordingly. In the same manner signal source 72 can be adjusted to raise or lower the absolute potential of resistors 42 and 43 raising or lowering voltage gradient 36 so that the peak is at ground potential. After this adjustment only a single column conductor 20 and a single row conductor 22 are simultaneously at ground potential, all other column conductors 20 are above ground and all other row conductors 22 are below ground. In the examples described above column conductor 20B and row conductor 22B were both at ground potential. Therefore blocking diode 17B is forward biased permitting photocurrent to flow through photodiode 17A as a function of the amount of light falling thereon. None of the diode pairs 14–16, or any other diode pair in the matrix 18 conduct current. Therefore the only photocurrent flowing through the matrix 18 occurs from conductor 22B to conductor 20B.

By measuring the current flow from driver 30 at this time, the amount of photocurrent through diode pair 17, and therefore the amount of light falling thereon can be determined. In order to measure this current meters 74 and 75 are placed in the connection between signal source 70 and driver 30. The output of current meters 74 and 75 is summed together in a summer 76, and an output is provided at a terminal 78 indicating the amount of illumination on diode pair 17. The photocurrent flowing through meters 74 and 75 begins at signal source 72, flows through driver 32, column conductor 22B, diode pair 17, row conductor 20B, driver 30, and returned to ground via signal source 70. The direction of the photocurrent is in the reverse direction through diodes 60–63 and 70–73. Therefore the reverse biased saturation current through these diodes should be larger than the anticipated photocurrent.

Other diode pairs, besides pair 17 can be rendered responsive to illumination by controlling the absolute potential of resistors 40–43. For example to shift the area of observation from diode 17 to diode pair 14 the absolute potential of resistor 40 is raised a certain increment so that the ground potential on resistor 40 occurs at the connection of diode 61A. At the same time the absolute potential of resistor 41 is lowered so that the ground potential occurs at the connection of diode 61B. Also at the same time the absolute potential of resistor 42 is lowered so that the ground potential on resistor 42 occurs at the connection of diode 73A, and the absolute potential of resistor 43 is raised so that the ground potential on resistor 43 occurs at the connection of diode 73B. For these conditions column conductor 20A and row conductor 22A are at ground potential causing diode 14B to be forward biased and rendering photodiode 14A responsive to the illumination thereon. At this time the signal on output terminal 78 is a function of the amount of illumination on diode pair 14.

Figure 3:
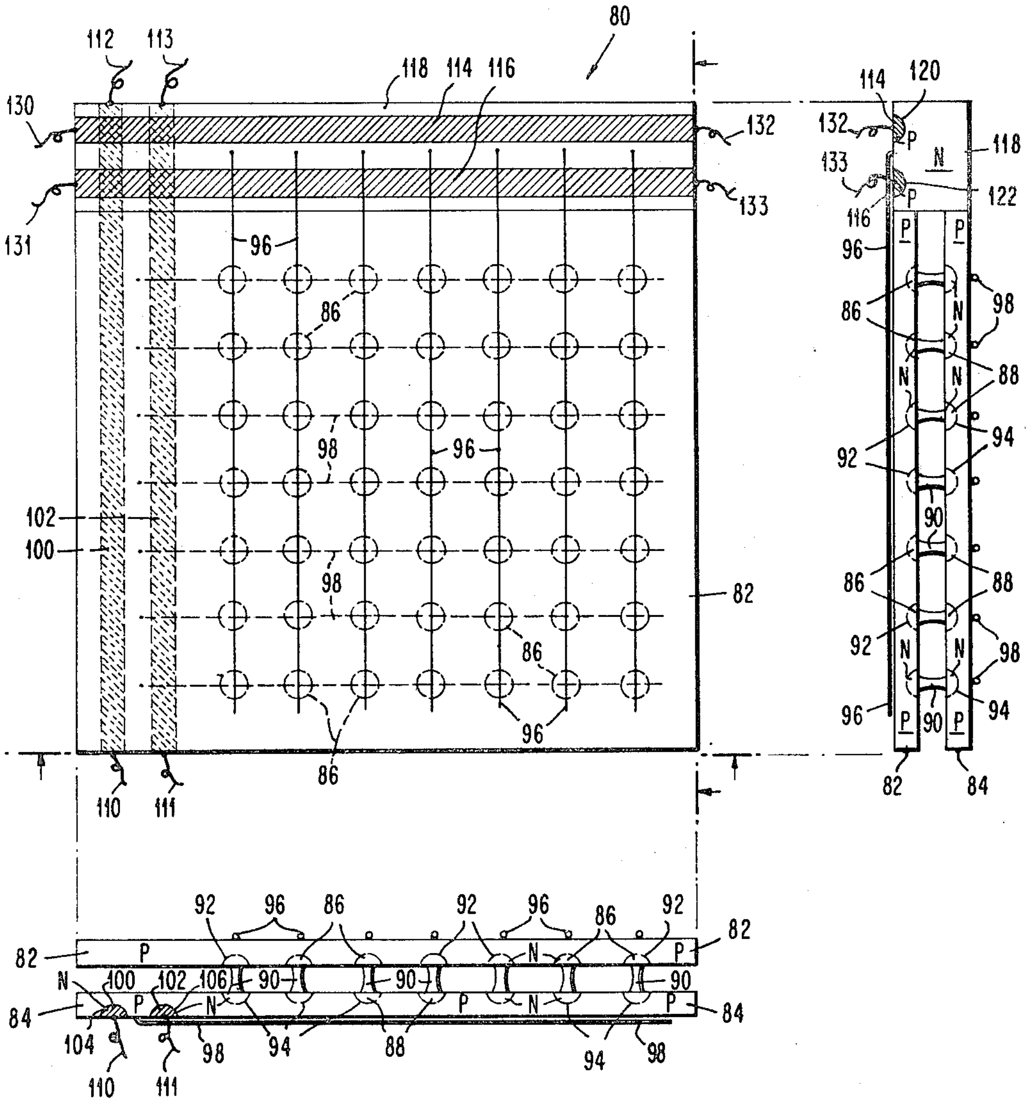
FIG. 3 includes a top view, and two side views of a multi-layer semiconductor device embodying the present invention.

The circuit 10 in FIG. 1 is shown to be composed of discrete components. However the circuit may be implemented with a multilayer semiconductor structure such as that shown in FIG. 3. The top view of a multilayer structure 80 as well as two side views are shown in FIG. 3. Two large rectangular layers 82 and 84 are composed of P-type semiconductor material. An array of spots 86 of N-type semiconductor material is formed in layer 82, and another array of spots 88 of N-type semiconducting material is formed in lower layer 84. An array of bridges 90 interconnect the spots 86 and 88.

An array of unilaterally conducting junctions 92 is formed between the spots 86 and layer 82. Another array of junctions 94 having photoconductive properties is formed between the spots 88 and layer 84. Junctions 92 and 94 correspond to the diodes represented by 14B–17B, and junctions 94 correspond to the diodes represented by 14A–17A.

A group of column conductors 96 is applied to the top of layer 82. A group of row conductors 98 shown in broken line in the top view of FIG. 3 is applied to the lower surface of layer 84. The layers 82 and 84 exhibit a high lateral resistance so that the junctions 92 and 94 are isolated from one another, and are in substantial electrical coupling only with the adjacent conductors 96 and 98.

The equivalent of driver 32 is formed in the structure of FIG. 3 by forming a pair of strips 100 and 102 of N-type semiconductor material in the bottom surface of layer 84. A pair of junctions 104 and 106 is formed between the strips 100 and 102 and the layer 84. These junctions 104 and 106 correspond to the series of diodes represented by diode pairs 70–73. Row conductors 98 are joined to semiconductor layer 84 midway between the strips 100 and 102. The junctions 104 and 106 are poled so that the forward direction of current flow is away from the row conductors 98. A group of leads 110 is joined to the ends of strips 100 and 102 to provide connections for batteries 52 and 53 and signal source 72.

The equivalent of driver 30 is formed in the structure of FIG. 3 by diffusing a pair of strips one in the upper surface of an elongated block of material 118 joined to the end of layers 82 and 84. The strips 114 and 116 are composed of P-type semiconducting material while block 118 is formed of N-type semiconducting material. A pair of junctions 120 and 122 is formed between strips 114 and 116 and the block 118. Column conductors 96 are joined to the block 118 midway between strips 114 and 116.

Junctions 120 and 122 correspond to the series of diodes represented by diodes 60A through 63A and diodes 60B through 63B, respectively. The junctions 120 and 122 are poled so that the forward direction of current flow is toward the column conductors 96. A group of leads 130–133 is connected to the ends of strips 114 and 116 to provide connections for batteries 50, 51 and meters 74 and 75.

The operation of the structure of FIG. 3 is the same as circuit 10 of FIG. 1. Conduction can be enabled through any one of the bridges 90 by varying the absolute potential applied to strips 110, 111, 114 and 116. Also by lowering the voltage gradient 34 or raising the voltage gradient 36 more than one pair of adjacently located junctions 92 and 94 may be enabled. This is equivalent to increasing the area of observation.

Another modification can be made by raising the voltage gradient 34 or lowering the voltage gradient 36 in which case all of the junctions 92 are back biased effectively "blanking" the entire operation.

Many other alternative embodiments of the present invention are suggested in the above application Ser. No. 460,233 including substituting photodiodes 14A–17A with photoresistors, or photoemitting elements. The later substitution causes the conversion of electrical energy into radiation, instead of the present conversion of radiation into electrical energy.

While the invention has been particularly shown and described with reference to preferred embodiments thereof, it will be understood by those skilled in the art that various changes in form and details may be made therein without departing from the spirit and scope of the invention.

What is claimed is:

1. In a two dimensional scanner the combination of:
a plurality of pairs of series connected elements, each pair having a first and a second end terminal for receiving signals, said pairs of elements being arranged in a co-ordinate array of rows and columns, and one element in each pair having radiation converting properties and the other element having unilaterally conducting properties; and
signal generating means for providing a first series of voltage levels in the form of a voltage gradient having a dip therein, and for providing a second series of voltage levels in the form of a peaked voltage gradient, said signal generating means including an additional plurality of pairs of series connected unilaterally conducting elements, and voltage distributing means for applying an ascending voltage gradient to one side of said additional pairs and a descending voltage gradient to the other side of additional pairs of elements, whereby said first and second series of voltages are produced at the connection between the two elements in each said additional pair; and
connecting means for applying a different level in said first series to the first ends of each row of said elements, and for applying a different level in said second series to the second ends of each column of said elements, whereby at least one pair of elements located at the co-ordinate where said peak and dip voltages coincide is rendered operative.

2. Apparatus as defined in claim 1 further characterized by the addition of means for monitoring the amount of current flowing through said pairs of conducting elements.

3. Apparatus as defined in claim 1 wherein the absolute potentials of said ascending and descending voltage levels are selected to cause said peak and dip voltages to be substantially at the same potential to cause all pairs of elements not located at the co-ordinates of said peak and dip voltages to be inoperative.

4. In a two dimensional scanner, the combination of:

a plurality of first pairs of series connected elements, each having a first and a second end terminal for receiving signals, and each said pair arranged in a co-ordinate array of rows and columns, and one element in each said pair having radiation converting properties and the other element having unilaterally conducting properties;

a plurality of second pairs of unilaterally conducting elements connected in series with forward conductivity directions oriented away from one another, each second pair having a first and a second end terminal for receiving signals;

a plurality of third pairs of unilaterally conducting elements connected in series with forward conductivity directions oriented toward one another, each third pair having a first and a second end terminal for receiving signals;

coupling means for joining the connections between the elements of said second pairs with the first ends of said first pairs, each second pair being coupled to a different row of said first pairs, and for joining the connections between the elements of said third pairs with the second ends of said first pairs, each third pair being coupled to a different column of said first pairs;

a first, a second, a third, and a fourth attenuator each having connections distributed along the lengths thereof to the first ends of said second pairs, the second ends of said second pairs, the first ends of said third pairs, and the second ends of said third pairs respectively; and signal generator means for providing currents through said first and second attenuators in opposite relative directions, and for providing currents through said third and fourth attenuators in opposite relative directions, whereby said second pairs provide a voltage gradient having a peak therein to said rows, and said third pairs provide a voltage gradient having a dip in the distribution, causing at least one of said first pairs of elements located at the co-ordinate whereby said peak and dip coincide to be rendered operative.

5. Apparatus as defined in claim 4 wherein said signal generator provides currents at potentials selected to cause said peak and dip voltages to be subtantially at the same potential.

6. Apparatus as defined in claim 4 wherein said signal generator includes a signal source for varying the absolute potentials of the currents through said attenuators to vary the location in the array of the coincidence of said peak and dip voltages.

7. Apparatus as defined in claim 5 further characterized by the addition of means for monitoring the amount of current flowing between said signal source and said third and fourth attenuators.

References Cited

UNITED STATES PATENTS 3,317,733 5/1967 Horton et al. -------- 250—211

RALPH G. NILSON, *Primary Examiner.*

M. ABRAMSON, *Assistant Examiner.*